US008375044B2

(12) United States Patent
Zabokritski et al.

(10) Patent No.: US 8,375,044 B2
(45) Date of Patent: Feb. 12, 2013

(54) QUERY PROCESSING PIPELINES WITH SINGLE-ITEM AND MULTIPLE-ITEM QUERY OPERATORS

(75) Inventors: Evgueni Zabokritski, Redmond, WA (US); Matthew J. Warren, Redmond, WA (US); Anders Hejlsberg, Seattle, WA (US); Luca Bolognese, Redmond, WA (US); Erik Meijer, Mercer Island, WA (US); Dinesh Chandrakant Kulkarni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 12/144,639

(22) Filed: Jun. 24, 2008

(65) Prior Publication Data

US 2009/0319498 A1    Dec. 24, 2009

(51) Int. Cl.
*G06F 17/30* (2006.01)
(52) U.S. Cl. ........................................ 707/760
(58) Field of Classification Search .......... 707/759, 707/760
See application file for complete search history.

(56) References Cited

U.S. PATENT DOCUMENTS

| | | | |
|---|---|---|---|
| 6,560,607 B1 | 5/2003 | Lassesen | |
| 6,882,993 B1 | 4/2005 | Lawande et al. | |
| 6,898,604 B1 | 5/2005 | Ballinger et al. | |
| 7,107,282 B1 | 9/2006 | Yalamanchi | |
| 7,164,676 B1 | 1/2007 | Chakraborty | |
| 7,246,114 B2 | 7/2007 | Bolognese et al. | |
| 2001/0054172 A1 | 12/2001 | Tuatini | |
| 2004/0030679 A1 | 2/2004 | Gonnet | |
| 2004/0073828 A1 | 4/2004 | Bronstein | |
| 2004/0193575 A1 | 9/2004 | Chen et al. | |
| 2004/0194057 A1 | 9/2004 | Schulte et al. | |
| 2004/0194068 A1 | 9/2004 | Warren et al. | |
| 2004/0267760 A1 | 12/2004 | Brundage et al. | |
| 2005/0097146 A1 | 5/2005 | Konstantinou et al. | |
| 2005/0183071 A1 | 8/2005 | Meijer et al. | |

(Continued)

FOREIGN PATENT DOCUMENTS

| | | |
|---|---|---|
| EP | 0378367 A2 | 7/1990 |
| WO | WO 2007/061430 A1 | 5/2007 |

OTHER PUBLICATIONS

Hall Tim, "Bulk Collection of DML Results", Date: 2006, 5 Pages, http://www.dba-oracle.com/plsql/t_plsql_dml.htm.

(Continued)

*Primary Examiner* — Robert Beausoliel, Jr.
*Assistant Examiner* — Nirav K Khakhar
(74) *Attorney, Agent, or Firm* — Microsoft Corporation

(57) ABSTRACT

Queries against data sources (such as language-integrated queries to be applied against relational databases) may be prepared for processing by a query processing pipeline. This pipeline performs services including transforming the query into a form more easily applied by the data source, e.g., into SQL, by matching query terms with query operators configured to handle various query operations. Many query processing pipelines include single-item query operators that perform individual operations (e.g., an updating query operator that specifies an updating of individual records of a table.) An integrated query pipeline may be devised that includes both single-item query operators and multiple-item query operators that specify operations on sets of data items. An integrated query processing pipeline may analyze the query to determine whether a single-item or multiple-item operation is specified in order to select an appropriate query operator, which may improve the efficiency and performance of the data source querying.

20 Claims, 5 Drawing Sheets

U.S. PATENT DOCUMENTS

| | | | |
|---|---|---|---|
| 2005/0262124 | A1 | 11/2005 | Christensen et al. |
| 2006/0053159 | A1 | 3/2006 | Aridor et al. |
| 2006/0212418 | A1 | 9/2006 | Dettinger et al. |
| 2006/0253430 | A1 | 11/2006 | Fernandes et al. |
| 2006/0288047 | A1 | 12/2006 | Chron et al. |
| 2007/0006128 | A1 | 1/2007 | Chowdhary et al. |
| 2007/0006145 | A1 | 1/2007 | Hill et al. |
| 2007/0027849 | A1 | 2/2007 | Meijer et al. |
| 2007/0027905 | A1 | 2/2007 | Warren et al. |
| 2007/0050348 | A1 | 3/2007 | Aharoni et al. |
| 2007/0083807 | A1 | 4/2007 | Shaudys et al. |
| 2007/0174763 | A1 | 7/2007 | Chang et al. |
| 2007/0219973 | A1 | 9/2007 | Cui et al. |
| 2007/0226196 | A1 | 9/2007 | Adya et al. |
| 2007/0226203 | A1* | 9/2007 | Adya et al. ................ 707/4 |
| 2007/0271233 | A1 | 11/2007 | Hejlsberg et al. |
| 2009/0319496 | A1 | 12/2009 | Warren et al. |
| 2009/0319497 | A1 | 12/2009 | Bolognese et al. |
| 2009/0319499 | A1 | 12/2009 | Meijer et al. |
| 2009/0327220 | A1 | 12/2009 | Meijer et al. |

OTHER PUBLICATIONS

Hall Tim, "Bulk Update Operations", Date: 2006, 4 Pages, http://www.dba-oracle.com/plsql/t_plsql_bulk_update.htm.

"Oracle PL/SQL Programming Guide to Oracle 8i Features", 6 Pages, http://www.unix.org.ua/orelly/oracle/guide8i/ch05_02.htm.

U.S. Appl. No. 12/144,634, filed Jun. 24, 2008, Bolognese et al.

U.S. Appl. No. 12/144,630, filed Jun. 24, 2008, Warren et al.

U.S. Appl. No. 12/144,670, filed Jun. 24, 2008, Torgersen et al.

U.S. Appl. No. 12/145,523, filed Jun 25, 2008, Meijer et al.

Box et al. "The LINQ Project .NET Language Integrated Query", Date: May 2006, 31 Pages.

Champion Michael "NET Language-Integrated Query for XML Data", Date: Feb. 2007, pp. 1-27, http://msdn2.microsoft.com/en-us/library/bb308960.aspx.

"Expression Trees in LINQ", Copyright 2007, 1 Page http://msdn2.microsoft.com/en-us/library/bb882636.aspx.

Hejlsberg et al. "The. NET Standard Query Operators", Copyright: 2006, pp. 1-30 http://download.microsoft.com/download/5/8/6/5868081c-68aa-40de-9a45-a3803d8134b8/standard_query_operators.doc.

Kostoulas, et al., "XML Screamer: An Integrated Approach to High Performance XML Parsing, Validation and Deserialization", Proceedings of the 15$^{th}$ international conference on World Wide Web, Date: May 23-26, 2006, pp. 93-102, Publisher: ACM New York, NY, USA.

Meijer Erik, "LINQ 2.0: Democratizing the Cloud", pp. 1-4 http://2007.xtech.org/public/asset/attachment/184.

Meijer, et al. "Visual Studio Developer Center", Date: Feb. 2007, pp. 1-7, http://msdn2.microsoft.com/en-us/library/ms364068(VS.80).aspx.

Meijer et al., "XLinq: XML Programming Refactored (The Return of the Monoids)", 18 Pages, http://research.microsoft.com/~emeijer/Papers/XMLRefactored.html.

"Source and Target Operators", 34 Pages http://download.oracle.com/docs/cd/B31080_01/doc/owb.102/b28223/ref_src_tgt_opers.htm#i1175826.

"XQuery Operators", Copyright: 2005-2007, 6 Pages http://www.xquery.com/tutorials/guided-tour/xquery-operators.html.

* cited by examiner

QUERY PROCESSING PIPELINES WITH SINGLE-ITEM AND MULTIPLE-ITEM QUERY OPERATORS

BACKGROUND

Queries of data sources (e.g., SQL queries applied against a relational database) are often written in a programming language, such as a source code for an application. A query written in one manner (e.g., a language-integrated query specified according to a programming language) is often processed by a query processing pipeline, which interfaces the query with the data source by parsing the query, translating it into a more easily managed form (e.g., SQL or an expression tree), serializing any objects or values used in the query, and sending the translated query to the data source. The query processing pipeline may also receive a query result, such as a result data set, and may present it to the rest of the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Query processing pipelines often involve one or more query operators, which are components configured to provide querying services (e.g., parsing the query, validating the syntax, and generating a translation) for a particular query term, such as SELECT, WHERE, JOIN, ORDER BY, etc. The query processing pipeline may therefore parse the query by selecting a query operator for respective query terms, and by invoking the selected query operators to generate appropriate elements of the translated query.

In many query processing pipelines, these operators act on a per-item basis, and may reference a local representation of the data source. For example, an UPDATE query operator may operate on a local representation of a data table, and may specify a SQL query for each updated record that specifies how the record in the local representation differs from the corresponding record in the data source. While this is suitable for some scenarios (e.g., where the records have changed in individualized ways), this may be very inefficient in other scenarios (e.g., where a set of records having a certain characteristic are to be updated in bulk.) For example, where a particular attribute of records in a table is to be incremented, an individualized query may examine the local representation of the data table, compute the new value of the attribute, and set the attribute or the individual records of the data source (e.g., "set X=12 where ID=1; set X=46 where ID=2; . . .") The use of an individualized query operator for an operation on more than one item results in an undesirable multiplication of queries, which may create considerable performance difficulties.

A more efficient technique for processing queries involves a query processing pipeline having two types of query operators: single-item query operators that operate on one item (e.g., one record), and multiple-item query operators that operate on many items having a shared property. When choosing a query operator for a term of a query, the query processing pipeline may assess the logic of the query term, and may select either a single-item version or a multiple-item version of the query operator based on the desired operation. By adding multiple-item query processors to the set of single-item query processors, the query processing pipeline may therefore achieve a more efficient and robust parsing, translating, and applying of the query to the data source.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
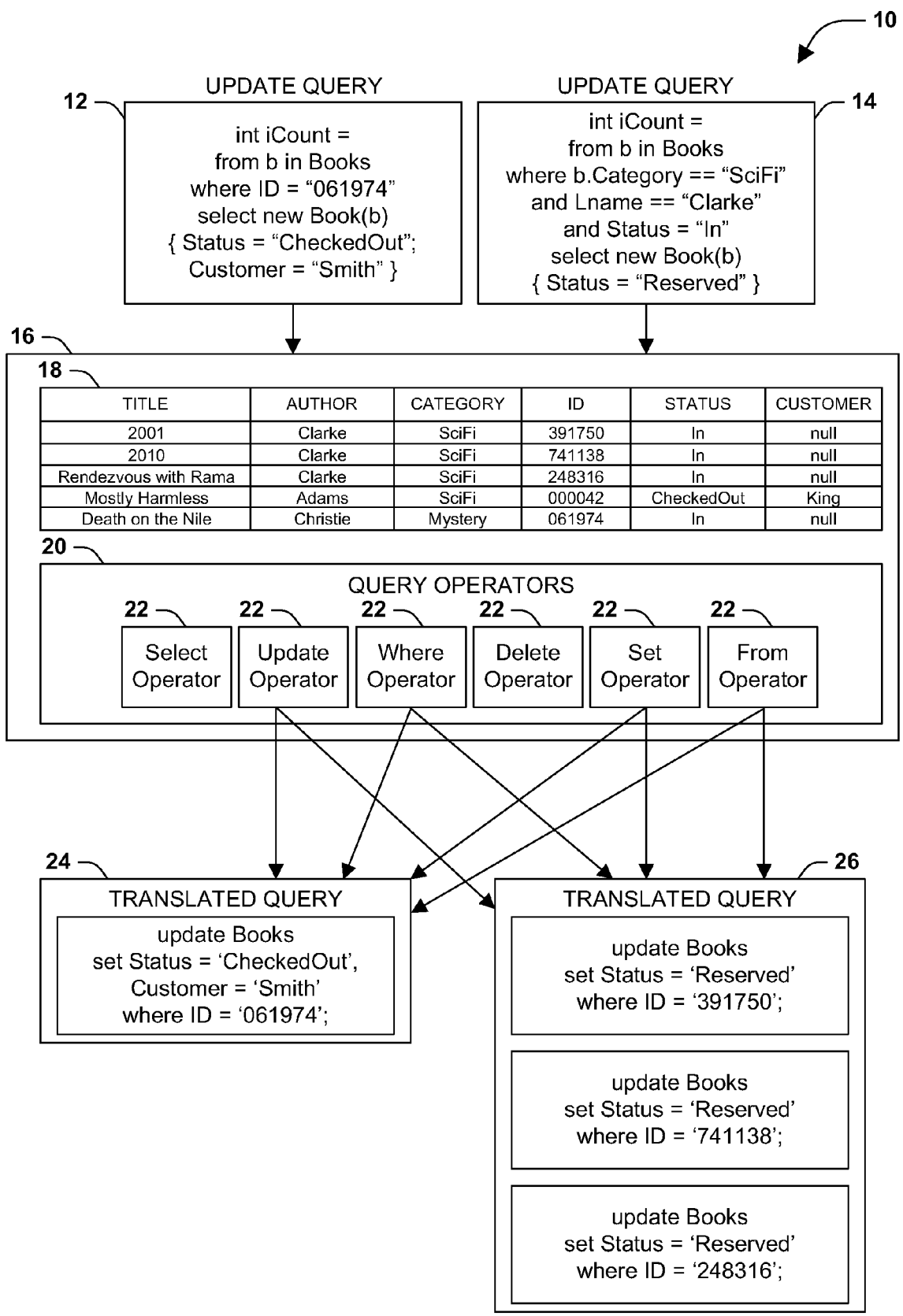
FIG. 1 is an illustration of an exemplary processing of a query to be applied against a data source by an exemplary query processing pipeline.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Queries against data sources (such as relational databases) may be devised in many computing scenarios, such as data-driven applications and websites rendered from content management systems. A query is conventionally written in a language, such as a general query language (such as SQL), a domain-specific query language, or a programming language (such as a language-integrated query), and specifies the logical operations to be performed on a data source in order to retrieve a desired set and shape of data from the data source and/or to alter the data source in a desired manner.

A query written in a language is often processed in order to issue the query against the data source. This processing may involve, e.g., validating the syntax of the query according to the conventions of the language, transforming the query into a form that is more easily processed by the data source (such as an expression tree), and serializing local objects to be used in the query. The query may then be delivered to the data source (e.g., a relational database server) for application against the data source. If the application results in a response, such as an indication of query success or completion or a result data set retrieved by the query, the processing may also involve receiving and handling the response, e.g., by deserializing one or more objects representing the result data set. Together, these processing aspects form a query processing pipeline that provides a variety of services while operating as an interface between the query and the data source.

Query processing pipelines are often designed predominantly to handle the four basic types of queries: CREATE or INSERT queries, which insert new records or objects into the data source; READ or SELECT queries, which retrieve data from the data source; UPDATE queries, which modify data already in the data source; and DELETE queries, which remove records or objects from the data source. Other types of queries may also be available, such as queries that explore or modify the structure of the data source, but these four types of queries often comprise the bulk of interactions with the data source.

In order to handle the four predominant types of queries (CREATE/INSERT, READ/SELECT, UPDATE, and DELETE), query processing pipelines are often configured with a set of query operators that are configured for one of these actions, such as an insert query operator, a select query operator, an update query operator, and a delete query operator. Other query operators may be included to handle other operations of the query (e.g., a join query operator may be provided for operations that involve connecting different sets of relationally linked data; a sum query operator may be provided for operations that involve adding a series of values; and a sort query operator may be provided for operations that involve sorting values.) These query operators may provide a variety of services in the query processing pipeline, such as validating the syntax and logic of the specified operation and generating SQL or a node of an expression tree representing the specified operation. The processing of the query may then involve parsing the query to identify the types of operations specified in the terms of the query, selecting an appropriate query operator for respective terms of the query, and invoking the query operators to perform a service (such as generating SQL) for these query terms.

Different types of query processing pipelines may feature different sets of query operators that perform different types of services. However, in many query processing pipelines, the predominant query operators are devised to handle data on a per-item basis. For example, an update query operator may be configured to update records of a relational data source (or objects of an object-oriented data source, etc.) by querying the data source for each update on a per-item basis. If the query updates several items, the update query operator may individually request each update. This may be achieved with reference to a local representation of the items to be changed. The update query operator may examine each item to be changed, determine which aspects of respective items have been altered since retrieval from the data source, and may issue one updating query for each item to request the alterations that synchronize the version of the item in the data source with the local representation.

A per-item configuration of query operators may be suitable for many types of query operations, and for many types of queries. If respective items have changed in individualized ways, it may be efficient to record the changes to each item in the data source. However, for other types of query operations and queries, a per-item configuration may be inefficient. If a query specifies an updating of many items in the data source in a similar manner, such as by incrementing a numeric property of the items by a fixed amount, then it may be inefficient for the query operator to specify a new value for each updated item. This per-item manner may involve reading the former value of each item, incrementing the value, and querying the data source to set the new value for the item. Similarly, if many items matching a certain condition are to be deleted, it may be inefficient for the delete query operator to identify the individual items to be deleted and to query the data source to delete respective items. These inefficiencies may create significant problems where the query operates on a large number of objects, since data sources often include millions or billions of items.

FIG. 1 illustrates an exemplary scenario 10 involving a processing of two queries (specified as language-integrated queries) through a portion 16 of a query processing pipeline, which is configured to generate translated queries (specified in SQL) that may be sent to a data source for processing. The exemplary queries specify some update operations on a database of books in a library, where the first query 12 specifies a single-item update (marking a particular book as checked out by a user named "Smith") and the second query 14 specifies a multiple-item update (marking as "Reserved" the set of books written by an author with a last name of Clarke in the category of science fiction that are not yet checked out.) The portion 16 of the query processing pipeline includes a local representation 18 of a portion of the data source, which includes some of the records of the data source that may be more quickly referenced than a round trip to the data source. The portion 16 of the query processing pipeline also includes a query operators set 20 featuring query operators 22 configured to handle particular query terms (in this case, by translating the query terms from the programming language of the language-integrated query into SQL.)

The first query 12 in FIG. 1 is parsed into constituent query terms, comprising a "from" query term, a "where" query term, a "select" query term, and two "set" query terms. The parsed query terms are matched with query operators 22, which are then invoked to generate SQL query terms that are combined to form a translated query 24 in SQL. This translated query 24 specifies an updating of a particular record identified by an ID field (presumably a primary key of the relational table) and indicates that a couple of attributes are to be set to particular values. Similarly, the second query 14 in FIG. 1 is parsed into constituent query terms, comprising a "from" clause, three "where" clauses, a "select" clause, and a "set" clause. The portion 16 of the query processing pipeline again matches the parsed query to query operators 22 configured to perform the operations specified by the query terms, and the query terms are subsequently invoked to produce a set of translated queries 26 in SQL that together perform the update operation. However, the second query 14 specifies an operation to be performed on multiple items sharing some properties (in this case, multiple books written by the author "Clarke" in the category of science fiction that are not currently checked out are to be marked as "Reserved".) Because the query operators 22 are configured to process the query terms on a single-item basis, the query operator 22 for the "Update" operation generates SQL statements by referencing the local representation 18 of the data source, identifying the records that match the "Where" clause conditions, selecting the primary key (the ID attribute) of the records, and generating a translated query 26 that updates each item, identified by its primary key. As a result, the single-item "Where" query operator 22 produces one query for each item to be updated. This single-item processing may be very inefficient where the number of updates is very large, e.g., where the local representation 18 and the data source include a large number of records to be updated.

An alternative technique may be devised that reduces the inefficiency of processing multiple-item queries with single-item query operators in the query processing pipeline. Instead of operating on a per-item basis, it may be more efficient for a query operator to specify the operation to be performed and the types of items involved. For example, the updating query operator may instruct the data source (e.g., by generating appropriate SQL or a particularly configured node in an expression tree) to increment the specified property by a fixed amount for all items matching a certain condition, and the delete query operator may specify that all items matching certain criteria are to be deleted. Thus, instead of formulating a series of queries such as "delete item 12; delete item 17; delete item 26;", the delete query operator may formulate a single query such as "delete items where property X>100."

One technique for achieving this capability is to supplement the set of single-item query operators with multiple-item query operators. For example, a single-item delete query operator may be included that deletes items on a per-item basis, and a multiple-item delete query operator may be included that deletes sets of items having specified characteristics. The query processing pipeline may parse a term of a query to determine not only which type of query operator is to be selected, but also to determine whether the query term specifies a single-item operation that is better handled by a single-item query operator or a multiple-item operation that is better handled by a multiple-item query operator. The query processing pipeline may therefore provide an improved interface that more flexibly operates on the data source, e.g., by formulating operations that are more appropriate to the circumstances of a query, and by economizing resources (such as network bandwidth) while performing such operations.

Moreover, the integration of the multiple-item query operators with the single-item query operators in the query operators set promotes the processing of queries in a consistent manner. It may be possible to devise a first query processing pipeline for single-item queries, and a second query processing pipeline for multiple-item queries. However, this solution may be less advantageous in several aspects. As a first example, the creation of two or more query processing pipelines may involve a duplication of query processing components, such as those that perform query translation, query sending, and query mapping. The duplicate components may consume additional computing resources (volatile system memory, storage, etc.), and separate maintenance steps may be involved to keep the duplicate components in order. Additionally, the duplicate components may process queries in a different manner, giving rise to discrepancies in parsing similar queries that may be difficult to explain. As a second example, the query processing pipelines may generate some data structures to facilitate query processing, such as a set of mappings of data source objects and caches of various aspects of the data source, such as the local representation 18 of the data source illustrated in FIGS. 1-2. A non-integrated set of query processing pipelines (one for single-item queries, and one for multiple-item queries) may result in a duplication of such resources, and additional resources may be involved in synchronizing these resources. For example, if an alteration of a single item is made through the single-item query processing pipeline, a cached version of the item in the multiple-item query processing pipeline may become stale without notice, unless a resource-consuming synchronization is performed to promote consistency of the caches. In these and other aspects, an integrated query processing pipeline having both single-item query operators and multiple-item query operators may be advantageous over solutions featuring a multitude of query processing pipelines.

Figure 2:
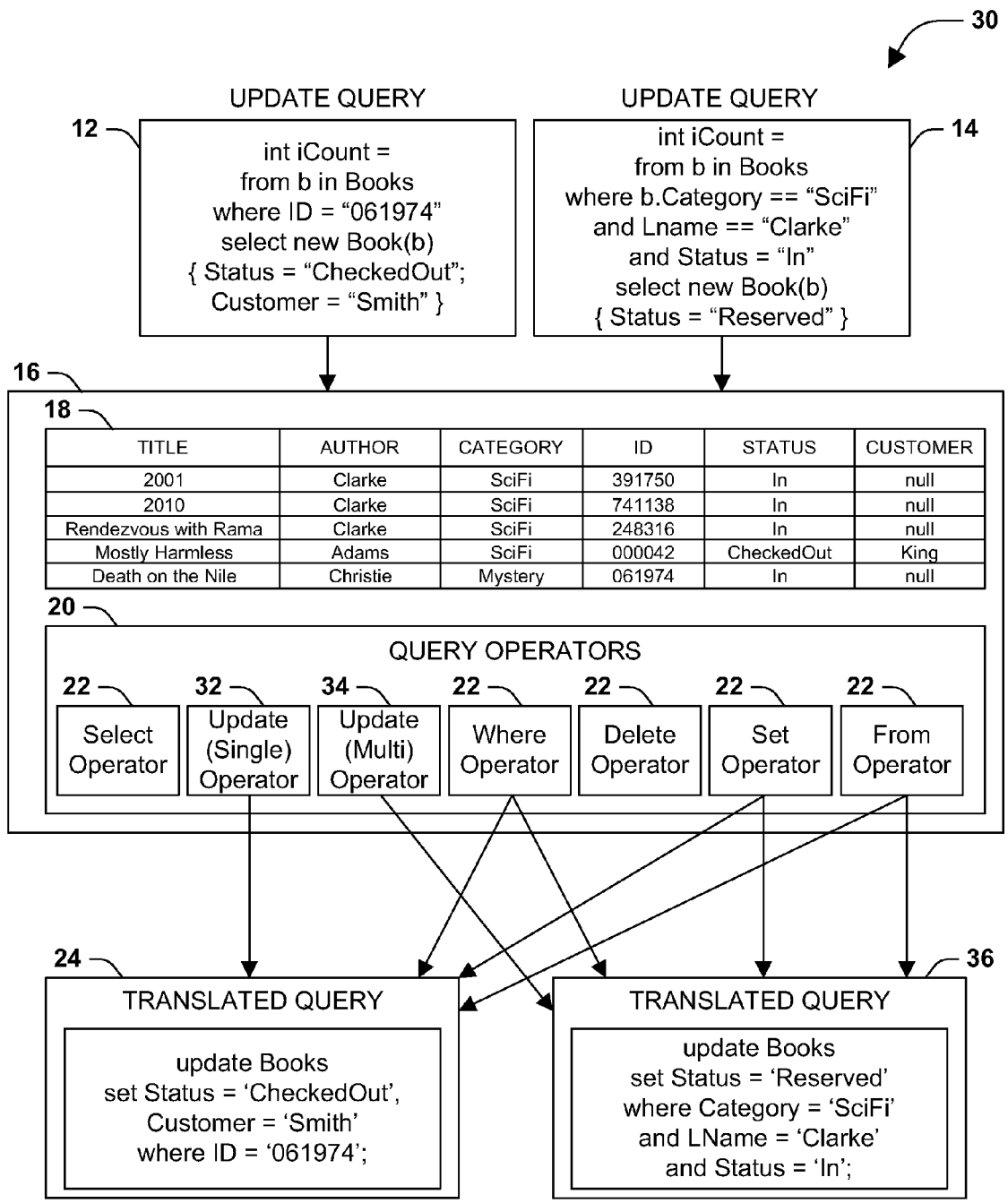
FIG. 2 is an illustration of another exemplary processing of a query to be applied against a data source by an exemplary query processing pipeline.

FIG. 2 illustrates an exemplary scenario 30 featuring an illustrated portion 18 of a query processing pipeline that contains a query operators set 20 having both single-item query operators and multiple-item query operators. In particular, this query operators set 20 comprises two versions of the update query operator: a single-item update query operator 32 for updating individual items, and a multiple-item update query operator 34 for updating multiple items. The first query 12 is processed in like manner as in FIG. 1, involving a parsing of the query into query terms, a selecting of query operators 20 for respective query terms, and an invocation of the selected query operators 20 to produce a translated query 24. In this scenario, however, the update query term is matched with the single-item update query operator 32, because the first query 12 specifies an update of a single item (based on the specification of a primary key, which can only match one record in the data source.) The second query 14 is also processed by the illustrated portion 16 of the query processing pipeline by parsing the query, selecting query operators for respective query terms, and invoking the query operators to produce the translated query 36. However, by contrast with the first query 12 and with the processing of the second query 14 in FIG. 1, the processing in FIG. 2 matches the second query 14 with the multiple-item update query operator 34, which generates a translated query clause specifying the updating of a set of items matching the specified criteria. As a result, the translated query 36 only comprises a single query, rather than a set of translated queries 26 as in FIG. 1. The resulting query operation may therefore be performed much more quickly and with an improved economy of computing resources.

Figure 3:
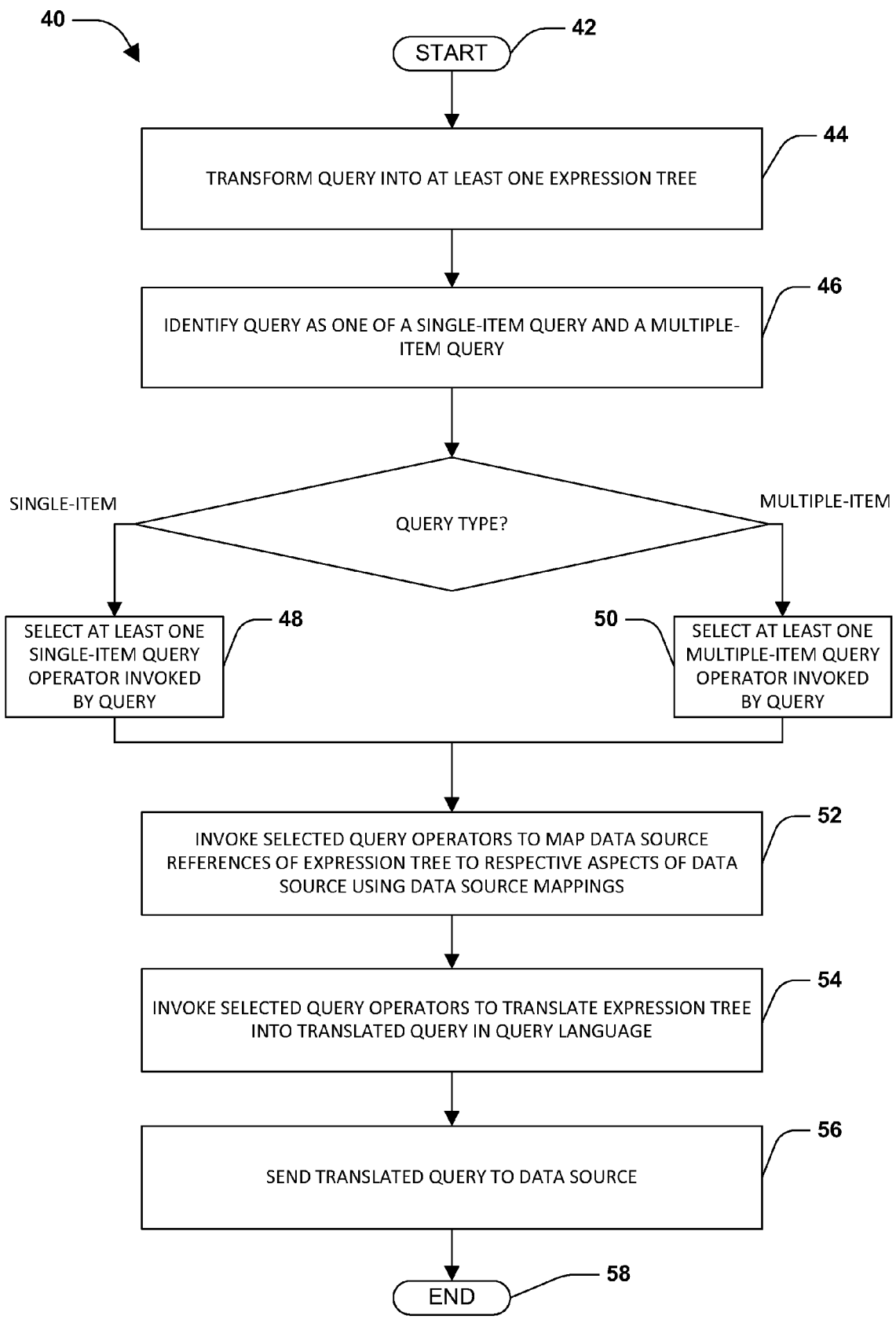
FIG. 3 is a flow chart illustrating an exemplary method of issuing a query comprising at least one data source reference to a data source.

FIG. 3 illustrates a first embodiment of these techniques, comprising an exemplary method 40 of issuing a query comprising at least one data source reference to a data source using a set of data source mappings and a set of query operators comprising at least one single-item query operator and at least one multiple-item query operator. The exemplary method 40 begins at 42 and involves transforming 44 the query into an expression tree. The exemplary method 40 also involves identifying 46 the query as one of a single-item query and a multiple-item query. This identifying may be performed, e.g., by evaluating whether the query references a particular item by a distinctive property (such as a key of a relational table), or whether it references a set of items by zero or more criteria. If the identifying reveals that the query is a single-item query, the exemplary method 40 branches and involves selecting 48 at least one single-item query operator invoked by the query. However, if the identifying reveals that the query is a multiple-item query, the exemplary method 40 branches and involves selecting 50 at least one multiple-item query operator invoked by the query. In either case, the exemplary method 40 involves invoking the selected query operators to map 52 the data source references of the expression tree to respective aspects of the data source using the data source mappings, and to translate 54 the expression tree into a translated query in a query language. Finally, the exemplary method 40 involves sending 56 the translated query to the data source. Having achieved the formulation and sending of the translated query using either a single-item query operator or a multiple-item query operator based on the nature of the query, the exemplary method 40 thereby achieves a performance of the query on the data source in an improved manner, and so ends at 58.

Figure 4:
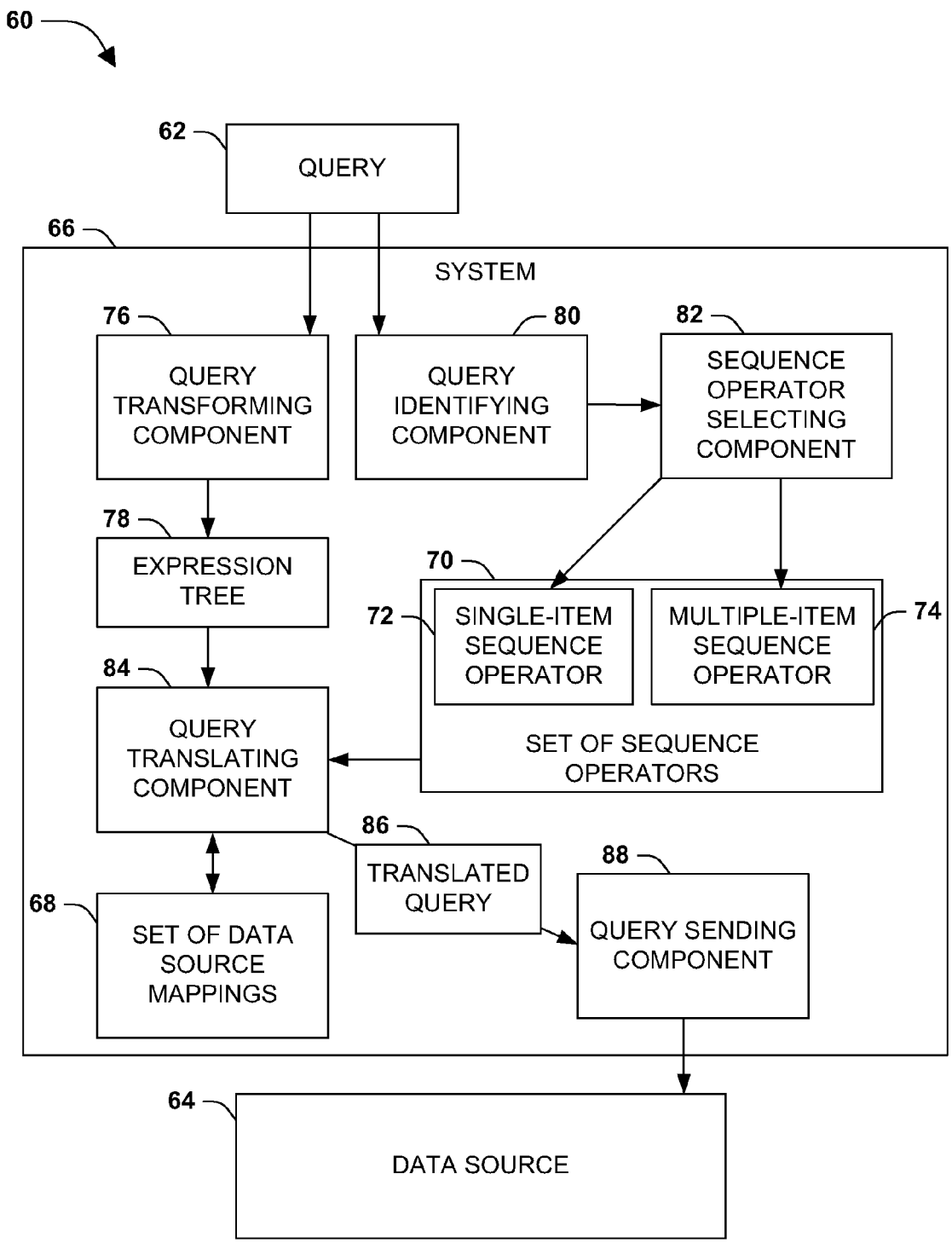
FIG. 4 is a component block diagram illustrating an exemplary system for issuing a query comprising at least one data source reference to a data source.

FIG. 4 illustrates a second embodiment of these techniques, comprising an exemplary scenario 60 for processing a query 62 for application to a data source 64 through an exemplary system 66 embodying the techniques discussed herein. The exemplary system 66 includes a set of data source mappings 68, which identify various objects of the data source 64 that may be referenced in the query 62 (e.g., the names of databases, data tables, attributes, stored procedures, etc.) and facilitate the association of query references to the items of the data source 64. The exemplary system 66 also includes a set of query operators 70 comprising at least one single-item query operator 72 and at least one multiple-item query operator 74.

The exemplary system 66 utilizes these resources to process the query 62 and deliver it to the data source 64 in the following manner. The exemplary system 66 includes a query transforming component 76, which is configured to transform the query 62 into an expression tree 78. The exemplary system 66 also includes a query identifying component 80, which is configured to identify the query 62 as one of a single-item query and a multiple-item query. The exemplary system 66 also includes a query operator selecting component 82 that utilizes the identification of the query 62 as a single-item query or a multiple-item query to select at least one single-item query operator 72 of the set of query operators 70 invoked by a single-item query, and/or at least one multiple-item query operator 74 of the set of query operators 70 invoked by a multiple-item query. The exemplary system 66 also includes a query translating component 84, which is configured to invoke the selected query operators to map the data source references of the expression tree 78 to respective aspects of the data source 64 using the data source mappings 68, and to translate the expression tree 78 into a translated query 86 in a query language (such as SQL.) Finally, the exemplary system 66 includes a query sending component 88 that is configured to send the translated query 86 to the data source 64 for processing. By processing the query 62 in this manner, the exemplary system 66 achieves the application of the query 62 to the data source 64 in an efficient manner that is better suited to the single-item or multiple-item nature of the query 62.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 66 of FIG. 4) to confer individual and/or synergistic advantages upon such embodiments.

A first aspect that may vary among embodiments of these techniques relates to the exchange of data associated with the query and the data source. As a first example, the query may reference one or more local objects, e.g., an object to be compared with items in an object database to determine if it is already present in the database, or an object containing a stored procedure to be invoked during the query. The query processing pipeline may facilitate the delivery of the object to the data source by serializing the at least one local object and sending a serialized representation of the at least one local object to the data source. As a second example, the query may produce a result, such as an indication of success or failure of a query, or a data set returned by a select query. The query processing pipeline may also facilitate the receipt of such results from the data source by receiving the query result from the data source in response to the query. The query processing pipeline may simply store the query result for use by the application. Alternatively, if the query result comprises at least one object, the query processing pipeline may deserialize the at least one local object; or, if the result is data-bound within the application, the query processing pipeline may store at least one aspect of the query result (e.g., an attribute, a count of returned items, etc.) in at least one of a primitive variable and/or at least one field of at least one local object. Many additional features may be added to the query processing pipeline to facilitate the exchange of data with the data source while implementing the techniques discussed herein. Those of ordinary skill in the art may devise many techniques for handling data exchange between the query and the data source while implementing the techniques discussed herein.

A second aspect that may vary among embodiments relates to the data set mappings. The data set mapping provide information about the objects of the data source (databases, tables, attributes, stored queries and procedures, etc.) and facilitate the association of references in a query with the objects of the database. This resource may be formulated and stored in many ways, e.g., as a schema definition of the data source (such as an XML Schema Definition object, or XSD), and/or as a set of metadata associated with respective aspects of the data source (e.g., as part of a local representation of the data source.) It may be appreciated that the development of a set of mappings as part of an integrated query processing pipeline featuring both single-item query operators and multiple-item query operators may be advantageous over embodiments featuring separate query processing pipelines for single-item queries and multiple-item queries, wherein duplicate sets of mappings may be generated that consume additional computing resources and may produce erratic query processing results if the sets of mappings fall out of synchronization. Those of ordinary skill in the art may devise many techniques for mapping aspects of the data source query references to while implementing the techniques discussed herein.

A third example that may vary among embodiments of these techniques relates to the formulation and use of one or more data source caches, which may be configured to store one or more aspects of the data source for local access that reduces the costs of network transport. One example of a data source cache is the local representation 18 of a portion of the data source illustrated and utilized in the exemplary scenario 10 of FIG. 1. By referencing a cached version of an aspect of the data source, the application may reduce an unnecessary fetching of data from the data source and enhance the completion of query processing. The data source cache may be configure to store aspects of a result data set received from the data source, so that subsequent queries pertaining to the same data items may instead use the values stored in the data source cache instead of re-querying the data source. For example, the query processing pipeline may evaluate whether a query is a selecting query or an updating query. If the query is a selecting query, the query processing pipeline may query the data source cache to identify at least one cached data source aspect referenced by the selecting query. If such an item is found, the query processing pipeline may return the cached data source aspect to the application in response to the query; but if such an item is not found, the query processing pipeline may send the query to the data source and store one or more aspects of the result data set in the data source cache to facilitate subsequent queries for these data items. The query processing pipeline may also cache updated values written to the data source, e.g., by identifying an altering query and caching at least one altered data source aspect in the data source cache. Again, it may be appreciated that an integrated query processing pipeline may be advantageous as compared with a set of two or more query processing pipelines for processing single-item queries and multiple-item queries respectively, which may involve a duplication of data source caches, and a potential for inconsistent query processing of single-item and multiple-item queries in the event of a desynchronization of the data source caches. Those of ordinary skill in the art may devise many techniques for caching aspects of the data source while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 5:
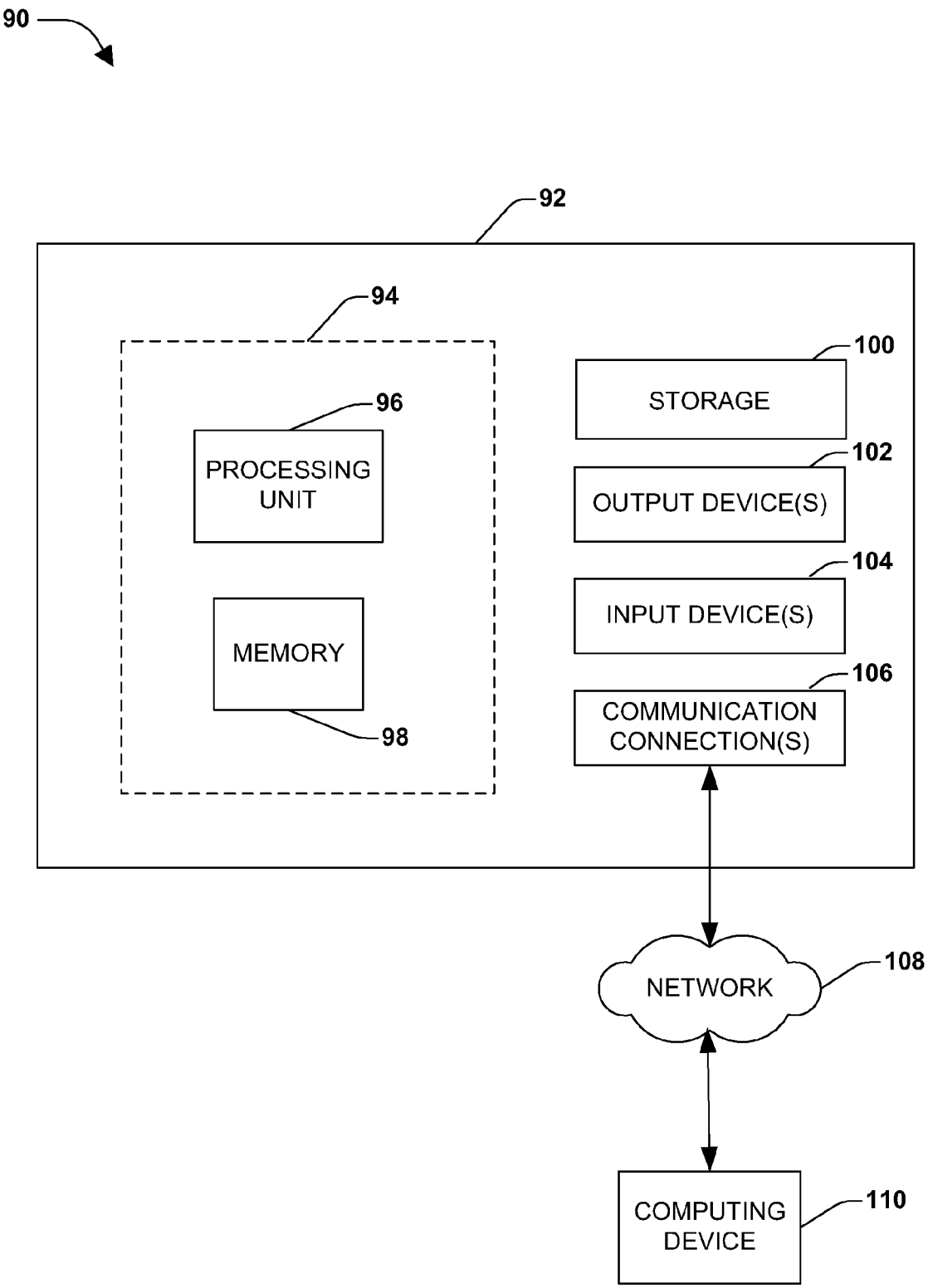
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 90 comprising a computing device 92 configured to implement one or more embodiments provided herein. In one configuration, computing device 92 includes at least one processing unit 96 and memory 98. Depending on the exact configuration and type of computing device, memory 98 may be volatile (such as RAM, for example), non-volatile (such as ROM, flash memory, etc., for example) or some combination of the two. This configuration is illustrated in FIG. 5 by dashed line 94.

In other embodiments, device 92 may include additional features and/or functionality. For example, device 92 may also include additional storage (e.g., removable and/or non-removable) including, but not limited to, magnetic storage, optical storage, and the like. Such additional storage is illustrated in FIG. 5 by storage 100. In one embodiment, computer readable instructions to implement one or more embodiments provided herein may be in storage 100. Storage 100 may also store other computer readable instructions to implement an operating system, an application program, and the like. Computer readable instructions may be loaded in memory 98 for execution by processing unit 96, for example.

The term "computer readable media" as used herein includes computer storage media. Computer storage media includes volatile and nonvolatile, removable and non-removable media implemented in any method or technology for storage of information such as computer readable instructions or other data. Memory 98 and storage 100 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 92. Any such computer storage media may be part of device 92.

Device 92 may also include communication connection(s) 106 that allows device 92 to communicate with other devices. Communication connection(s) 106 may include, but is not limited to, a modem, a Network Interface Card (NIC), an integrated network interface, a radio frequency transmitter/receiver, an infrared port, a USB connection, or other interfaces for connecting computing device 92 to other computing devices. Communication connection(s) 106 may include a wired connection or a wireless connection. Communication connection(s) 106 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 92 may include input device(s) 104 such as keyboard, mouse, pen, voice input device, touch input device, infrared cameras, video input devices, and/or any other input device. Output device(s) 102 such as one or more displays, speakers, printers, and/or any other output device may also be included in device 92. Input device(s) 104 and output device(s) 102 may be connected to device 92 via a wired connection, wireless connection, or any combination thereof. In one embodiment, an input device or an output device from another computing device may be used as input device(s) 104 or output device(s) 102 for computing device 92.

Components of computing device 92 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 92 may be interconnected by a network. For example, memory 98 may be comprised of multiple physical memory units located in different physical locations interconnected by a network.

Those skilled in the art will realize that storage devices utilized to store computer readable instructions may be distributed across a network. For example, a computing device 110 accessible via network 108 may store computer readable instructions to implement one or more embodiments provided herein. Computing device 92 may access computing device 110 and download a part or all of the computer readable instructions for execution. Alternatively, computing device 92 may download pieces of the computer readable instructions, as needed, or some instructions may be executed at computing device 92 and some at computing device 110.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of issuing a query comprising at least one data source reference to a data source using a set of data source mappings and a set of query operators comprising at least one single-item query operator and at least one multiple-item query operator, the method comprising:
   transforming the query into an expression tree;
   identifying the query as one of a single-item query and a multiple-item query;
   upon identifying a single-item query, selecting at least one single-item query operator applying the query to a single item of the data source;
   upon identifying a multiple-item query, selecting at least one multiple-item query operator applying the query to at least two items of the data source;
   invoking selected query operators to:
      map the data source references of the expression tree to respective aspects of the data source using the data source mappings, and
      translate the expression tree into a translated query in a query language; and
   sending the translated query to the data source.

2. The method of claim 1, the query comprising a language-integrated query.

3. The method of claim 1, the query comprising a data source altering query.

4. The method of claim 1, the set of data source mappings comprising at least one of:
   a schema definition, and
   a set of metadata associated with respective aspects of the data source.

5. The method of claim 1:
   the query referencing at least one local object, and
   the sending comprising:
      serializing the at least one local object, and
      sending a serialized representation of the at least one local object to the data source.

6. The method of claim 1, comprising: receiving a query result from the data source in response to the query.

7. The method of claim 6, comprising: deserializing at least one local object from at least one aspect of the query result.

8. The method of claim 6, comprising: storing at least one aspect of the query result in at least one of:
   at least one primitive variable, and
   at least one field of at least one local object.

9. The method of claim 6, the receiving comprising: caching at least one data source aspect of the query result in a data source cache.

10. The method of claim 9, the sending comprising:
    identifying the query as one of an altering query and a non-altering query; and
    upon identifying an altering query, caching at least one data source aspect set by the altering query in the data source cache.

11. The method of claim 10, the sending comprising:
    identifying the query as one of a selecting query and a non-selecting query;
    upon identifying a selecting query, querying the data source cache to identify at least one cached data source aspect referenced by the selecting query; and
    upon identifying at least one cached data source aspect referenced by the selecting query, returning the cached data source aspect in response to the query; and
    upon failing to identify at least one cached data source aspect referenced by the selecting query, sending the translated query to the data source.

12. A system for issuing a query comprising at least one data source reference to a data source, the system comprising:
    a set of data source mappings;
    a set of query operators comprising at least one single-item query operator and at least one multiple-item query operator;
    a query transforming component configured to transform the query into an expression tree;

a query identifying component configured to identify the query as one of a single-item query and a multiple-item query;
a query operator selecting component configured to select at least one of:
at least one single-item query operator applying a single-item query to a single item of the data source, and
at least one multiple-item query operator applying a multiple-item query to at least two items of the data source;
a query translating component configured to invoke the selected query operators to:
map the data source references of the expression tree to respective aspects of the data source using the data source mappings, and
translate the expression tree into a translated query in a query language; and
a query sending component configured to send the translated query to the data source,
respective instructions comprising instructions stored in a memory of a device and executable on a processor of the device.

13. The system of claim 12, the set of data source mappings comprising at least one of:
a schema definition, and
a set of metadata associated respective aspects of the data source.

14. The system of claim 12:
the query referencing at least one local object, and
the query sending component configured to:
serialize the at least one local object, and
send a serialized representation of the at least one local object to the data source.

15. The system of claim 12, comprising: a query result receiving component configured to receive a query result from the data source in response to the query.

16. The system of claim 15, the query result receiving component configured to deserialize at least one local object from at least one aspect of the query result.

17. The system of claim 15, comprising: at least one data source cache configured to cache at least one aspect of the data source upon sending a query and upon receiving a query result.

18. The system of claim 17, the query sending component configured to:
identify the query as one of an altering query and a non-altering query; and
upon identifying an altering query, cache at least one data source aspect set by the altering query in the data source cache.

19. The system of claim 18, the query sending component configured to:
identify the query as one of a selecting query and a non-selecting query;
upon identifying a selecting query, query the data source cache to identify at least one cached data source aspect referenced by the selecting query;
upon identifying at least one cached data source aspect referenced by the selecting query, return the cached data source aspect in response to the query; and
upon failing to identify at least one cached data source aspect referenced by the selecting query, send the translated query to the data source.

20. A system for issuing a data source altering query comprising at least one data source reference to a data source and referencing at least one local object, the system comprising:
a set of data source mappings comprising at least one of:
a schema definition, and
a set of metadata associated respective aspects of the data source;
a set of query operators comprising at least one single-item query operator and at least one multiple-item query operator;
a query transforming component configured to transform the query into an expression tree;
a query identifying component configured to identify the query as one of a single-item query and a multiple-item query;
a query operator selecting component configured to select at least one of:
at least one single-item query operator applying a single-item query to a single item of the data source, and
at least one multiple-item query operator applying a multiple-item query to at least two items of the data source;
a query translating component configured to invoke the selected query operators to:
map the data source references of the expression tree to respective aspects of the data source using the data source mappings, and
translate the expression tree into a translated query in a query language;
at least one data source cache configured to cache at least one aspect of the data source upon sending a query and upon receiving a query result;
a query sending component configured to:
serialize the at least one local object,
identify the query as one of an altering query and a non-altering query;
upon identifying an altering query, cache at least one data source aspect set by the altering query in the data source cache;
upon identifying a non-altering query:
query the data source cache to identify at least one cached data source aspect referenced by the non-altering query;
upon identifying at least one cached data source aspect referenced by the non-altering query, return the cached data source aspect in response to the query; and
upon failing to identify at least one cached data source aspect referenced by the non-altering query:
send the translated query to the data source, and
send a serialized representation of the at least one local object to the data source; and
a query result receiving component configured to:
receive a query result from the data source in response to the query, and deserialize at least one local object from at least one aspect of the query result, respective instructions comprising instructions stored in a memory of a device and executable on a processor of the device.

* * * * *